United States Patent [19]

Lorimor

[11] 4,343,151
[45] Aug. 10, 1982

[54] SERIES - PARALLEL SELECTOR FOR STEERING AND IMPLEMENT

[75] Inventor: Larry W. Lorimor, Joliet, Ill.

[73] Assignee: Caterpillar Tractor Co., Peoria, Ill.

[21] Appl. No.: 245,241

[22] PCT Filed: May 16, 1980

[86] PCT No.: PCT/US80/00577
   § 371 Date: May 16, 1980
   § 102(e) Date: May 16, 1980

[51] Int. Cl.³ .................. F15B 11/16; F15B 13/06; F16H 39/46
[52] U.S. Cl. .................................. 60/422; 60/424; 91/29; 91/33; 91/516; 91/520
[58] Field of Search .................. 60/422, 424, 484; 91/28, 29, 33, 516, 520

[56] References Cited

U.S. PATENT DOCUMENTS

| | | | |
|---|---|---|---|
| 2,859,762 | 11/1958 | Banker | 91/516 X |
| 3,073,123 | 1/1963 | Hodgson et al. | 60/424 |
| 3,641,879 | 2/1972 | Week et al. | 91/516 |
| 3,811,363 | 5/1974 | Cryder | 60/422 X |
| 3,878,679 | 4/1975 | Sievenpiper | 60/422 |
| 4,002,220 | 1/1977 | Wible | 60/422 X |
| 4,043,419 | 8/1977 | Larson et al. | 60/484 X |
| 4,089,169 | 5/1978 | Miller | 60/484 X |

Primary Examiner—Irwin C. Cohen

Attorney, Agent, or Firm—Phillips, Moore, Weissenberger, Lempio & Majestic

[57] ABSTRACT

Prior art interrupted series type load sensitive hydraulic systems have not had the capability of both providing full speed simultaneous vehicle cornering and implement correction while preventing the same when the implements are operating at a high pressure level, and preventing low torque motor stall. Herein, an input flow path (22) delivers pressurized fluid flow from a source (12) to a first priority (steering) circuit (14). A series flow path (24) delivers the output flow from the circuit (14) to an implement circuit (16). A parallel flow path (26) delivers a portion of the flow from the source (12) to the implement circuit (16). A valving structure (42) is in the series flow path (24). The valving structure (42) is opened in response to load pressure in the implement circuit (16) being at or below a selected value and is closed in response to the load pressure in the implement circuit being above said value. Generally, flow through the parallel flow path (26) is blocked when differential pressure in the steering circuit (14) is below a specified value. High speed turning and implement correction are provided at low pressures and are prevented when the implement is operating at high pressure level. Low torque motor stall is prevented. Utilization of vehicle horsepower is enhanced with the selectable series/parallel circuitry.

6 Claims, 1 Drawing Figure

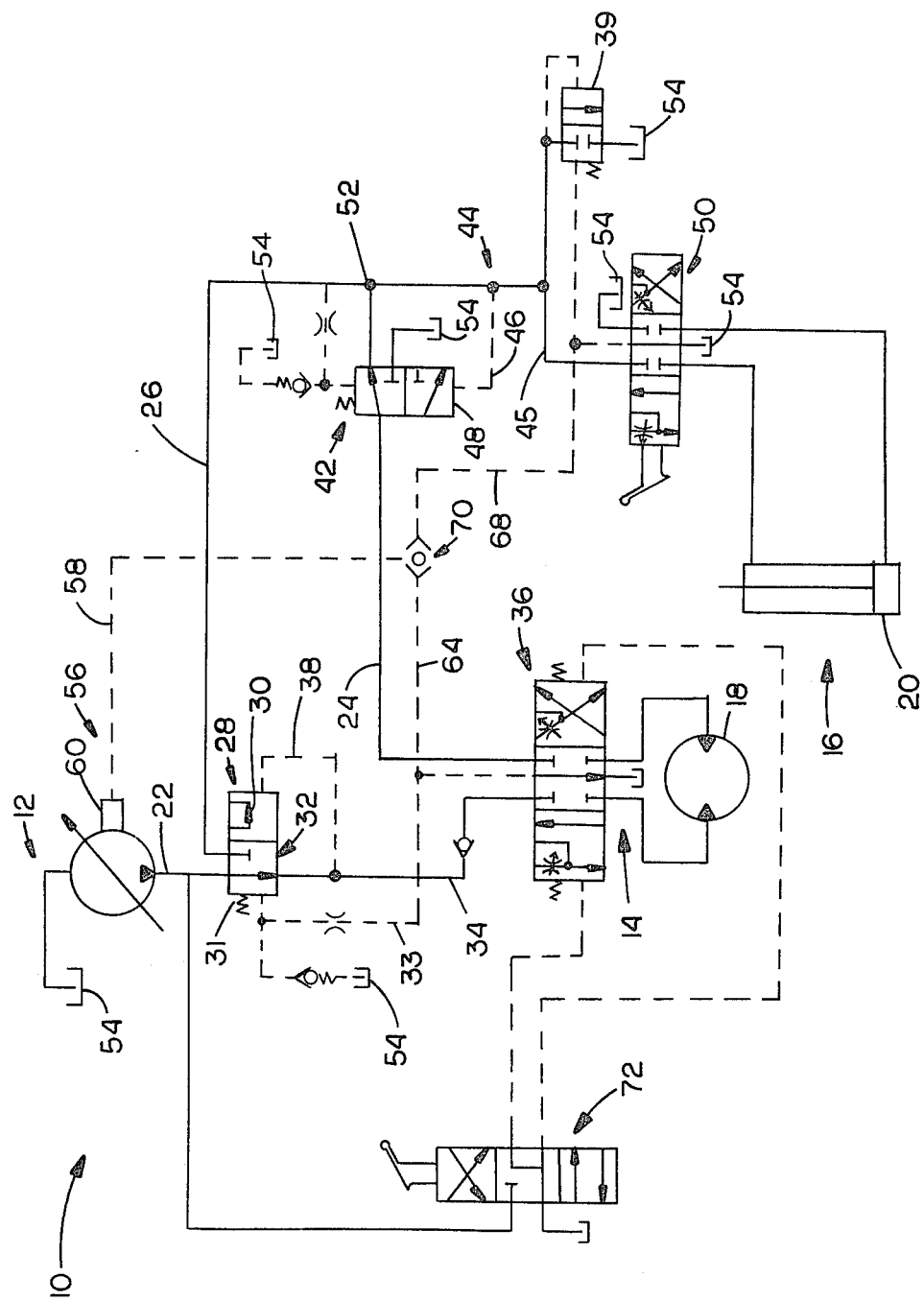

SERIES - PARALLEL SELECTOR FOR STEERING AND IMPLEMENT

TECHNICAL FIELD

This invention relates to a hydraulic control system for supplying pressurized fluid to two work circuits, one of which has priority over the other.

BACKGROUND ART

In many vehicles which have a hydraulic steering motor and a hydraulic implement circuit which receive flow from a single pump, the steering motor is connected upstream of and in series relation with the implement system. As a result, the pump is working against the sum of the load pressures of the steering motor and the implement circuits. The pump, however, can only operate up to its rated operating pressure and can only supply its maximum rated flow rate. Hence, if the implement circuit is experiencing a high load pressure, only a relatively low pressure (a portion of the pump rated operating pressure) is available across the steering motor for operating it. This can lead to low torque stalling of the steering motor. One can utilize a pump with a very high operating pressure and flow ratings, along with a high power engine to drive the pump, but this adds to the weight, size and cost of the vehicle.

Prior art load sensitive hydraulic systems, on the other hand, suffer from the disadvantage that the return flow from the priority work circuit is passed to tank regardless of the pressure requirements of subsequent circuits. This requires the use of a wastefully large pump.

In essence, it would be advantageous to have a system which gave first priority to the steering motor, which utilized a pump primarily sized to the steering motor, wherein the steering motor was not subject to low torque stalling, which provided both high speed turn and high speed implement correction when operating at relatively lower pressures and prevented such dual high speed operation when the implement was operating at a relatively higher pressure level, and which provided underspeed-type engine protection as well.

The present invention is directed to overcome one or more of the problems set forth above.

DISCLOSURE OF INVENTION

According to an embodiment of the present invention, an improvement is provided in a hydraulic system having a pressurized fluid source, a first work circuit having an output flow, a second work circuit, an input flow path connected to deliver flow of pressurized fluid from the source to the first circuit, and a series flow path connected to receive the output flow from the first circuit and to deliver the output flow to the second circuit. The improvement comprises a parallel flow path connected to receive a portion of the flow from the source and to deliver it to the second circuit. A valving structure is in the series flow path and means are provided for opening the valving structure to direct flow to the second circuit in response to load pressure in the second circuit being below a selected value. The valving structure blocks flow to the second circuit when the load pressure in the second circuit is above that value.

Through utilizing an improved hydraulic control system as set out above, motor discharge flow is supplied via series flow to the low pressure implement hydraulic functions, which thereby provides high speed cornering of the vehicle carrying the system and high speed implement correction at relatively lower pressures. Further, discharge from the vehicle steering motor is dumped to tank when implement pressures are high. The system thereby prevents low torque motor stall due to insufficient differential pressure across the steering motor. Also, the system provides underspeed-type engine protection whereby utilization of vehicle horsepower is enhanced.

BRIEF DESCRIPTION OF DRAWING

The drawing consists of a single FIGURE which schematically illustrates an embodiment of the present invention.

BEST MODE FOR CARRYING OUT THE INVENTION

The drawing illustrates a hydraulic control system 10. The system 10 includes a pressurized fluid source or pump 12. The pump 12 supplies fluid to a first work circuit 14 of primary (higher) priority and to a second work circuit 16 of secondary (lower) priority. The first work circuit 14 includes a motor 18, for example, a steering motor. The second work circuit 16 also includes a motor, for example, a hydraulic cylinder 20, which would typically serve for operating an implement of a vehicle, for example, for controlling the position of a dozer blade, or for controlling any of a number of other implements carried by a vehicle.

An input flow path 22 is connected to receive pressurized fluid from the pump 12 and to deliver it to the first work circuit 14 in a manner which will shortly become apparent. A series flow path 24 is connected to receive an output flow from the first work circuit 14 and to deliver the output flow to the second circuit 16.

In accordance with the present invention, a parallel flow path 26 is provided which is connected to receive a portion of the flow from the pump 12 and to deliver that portion to the second circuit 16. The parallel flow path 26 communicates with the input flow path 22 via a modulating priority valve 28. Priority valve 28 modulates between being in the position shown in the drawing wherein flow from path 22 is directed through priority valve 28 to the first work circuit 14 and being shifted leftwardly in the drawing, wherein the input flow path 22 connects to the parallel flow path 26 via an appropriate passage 30 defined by the priority valve 28. The portion of flow through passage 30 of the modulating priority valve 28 can be varied from zero flow up to the entire output of the pump 12 as will be described below.

The priority valve 28 delivers flow to a conduit 34 and thereby to a steering valve 36. Priority valve 28 also serves as means 32 for blocking a part (fraction) of the flow through the parallel flow path 26 in response to a predetermined pressure differential being established across the steering valve 36 (in the embodiment shown, a pilot controlled steering valve). The steering valve 36 controls the speed and direction of operation of the motor 18. The pressure differential is established by a spring 31. For a given displacement of steering valve 36, the pump flow increases until the pressure differential (line 38 minus line 33) exceeds the force of spring 31, causing the priority valve 28 to move leftwardly opening parallel flow path 26. If no flow is required by second work circuit 16, the pressure in parallel flow path 26 rises toward, for example, 200 psi, to dump over an unloading valve 39 which is spring loaded with a force equivalent to 200 psi. The pump 12 then destrokes to satisfy steering requirements. If circuit 16 requires flow, the parallel and/or series flow paths 24 and 26 supply flow as the pump 12 increases flow trying to build up, for example, 200 psi, above load.

In accordance with the present invention, a valving structure 42 is provided in the series flow path 24. Basically, the valving structure 42 serves as a series-parallel selector valve having an open position to direct flow from the series flow path 24 to the second circuit 16 and a closed position to block flow from the series flow path 24 to the second circuit 16. Means 44 are provided for opening the valving structure 42 in response to system pressure in the second circuit 16 being below a selected value and for closing the valving structure 42 in response to system pressure in the second circuit 16 being above that selected value. While hydraulic means 44 are shown in the drawing, equivalent electronic means, including pressure sensors and solenoid operated valves, may be substituted for the illustrated hydraulic means 44.

In the embodiment illustrated in the drawing, a pressure representative of the pressure in a flow path 45 is delivered via a line 46 to a first end 48 of the valving structure 42. The pressure in the flow path 45 is the same as that in the parallel flow path 26 and is determined by the pressure in the second work circuit 16, whenever an implement control valve 50 is shifted either leftwardly or righwardly from the center position shown in the drawing or by the unloading valve 39 connected to flow path 45. The pressure in line 46 which opens valving structure 42 is determined by the load pressure in the second work circuit 16.

When the pressure in the second work circuit 16 is below the aforementioned selected value, the valving structure 42 is in the position shown in the drawing. In that position, the series flow path 24 connects with the parallel flow path 26 at a junction, 52, from which the flow path 45 proceeds to the implement control valve 50.

When load pressure in the second work circuit 16, and thereby pressure in the line 46, is above the selected value, the valving structure 42 is shifted upwardly from the position shown in the drawing, thereby dumping flow from the series flow path 24 to a tank 54. This prevents series connection of the circuits 14 and 16 when the second work circuit 16 is working at high pressure. Hence, sufficient flow, at needed working pressure, is provided at all times to the steering motor 18.

One of the advantages of the present invention is, thus, that the pump 12 can be sized to primarily provide the steering function, although the pump 12 can be sized slightly larger so as to provide some implement operation, via the parallel flow path 26, even when the series flow path 24 is blocked off by the valving structure 42.

The pump 12 is preferably of the variable displacement type wherein the rate of fluid flow from the pump 12 can be controlled as needed. In the particular embodiment illustrated, means 56 are provided for controlling the rate of fluid flow from the pump 12, in response to the greater of the load pressures in the first circuit 14 and the second circuit 16. That is, whichever of the load pressures is greater, whether it be in the first circuit 14 or in the second circuit 16, that pressure is delivered via a line 58 to a conventional pump displacement control 60 which controls the pump 12 to provide the needed flow at the pressure needed to satisfy the load requirements up to some predetermined level.

In practice, the load pressure from the first circuit 14 is resolved in steering valve 36 and delivered to a line 64. At the same time, the load pressure in the second work circuit 16 is resolved in valve 50 and delivered to a line 68. The load pressures from the lines 64 and 68 are introduced to a resolver 70 which resolves the greater of these pressures into the line 58 for delivery to the pump displacement control 60.

While the particular steering valve 36 illustrated is of the pilot controlled variety, being controlled by a pilot control valve 72, it is clear that the invention is not so limited in that a manually controlled steering valve can be used in place of the pilot controlled valve 36.

INDUSTRIAL APPLICABILITY

The present invention is particularly useful with earth working equipment such as dozers and the like. In such a system, the primary priority circuit is the circuit which powers the steering of the dozer and the secondary priority circuit is a hydraulic cylinder which controls an implement.

With an invention as just described, the aforementioned problems of the prior art are eliminated. In particular, low torque stalling of the steering motor 18 is prevented. Also, high speed turning and implement correction are provided when operating at relatively low pressures. When the implement is operating at relatively high pressures, the series relationship is terminated and only low speed implement correction is available. High performance for low pressure requirements and lesser speeds for high pressure provide underspeed-type engine protection also.

Other aspects, objects and advantages of this invention can be obtained from a study of the drawings, disclosure and the appended claims.

I claim:

1. In a control system (10) having a pressurized fluid source (12), a first work circuit (14) which has an output flow, a second work circuit (16), an input flow path (22) connected to deliver flow of pressurized fluid from the source (12) to the first circuit (14), and a series flow path (24) connected to receive the output flow from the first circuit (14) and to deliver the output flow to the second circuit (16), the improvement comprising:
    a parallel flow path (26) connected to the source (12) and to the second circuit (16) and being adapted to receive a portion of the flow from the source (12) and deliver said portion to the second circuit (16);
    a single valve means (42) in the series flow path (24), having an open position adapted to direct flow from the series flow path (24) to the second work circuit (16) and a closed position adapted to block flow from the series flow path (24) to the second work circuit (16), means biasing said single valve means to said open position; and
    pressure responsive means (44) in continuous open communication with said parallel flow path (26) for permitting opening of said single valve means (42) by said biasing means in response to load pressure in the second circuit (16) being below a selected value and for closing said single valve means (42) in response to load pressure in the second circuit (16) being above said selected value.

2. The system (10) as set forth in claim 1, further including:

means (32) for blocking at least a fraction of the flow through said parallel flow path (26) in response to differential pressure in the first circuit (14) being below a specified value.

3. The system (10) as set forth in claim 1, further comprising:
   means (56) for controlling the rate of fluid flow from said source (12) in response to the differential pressure in the circuit (14 or 16) having the greater of the load pressures.

4. The system (10) as set forth in claim 1, wherein said source (12) includes only a single pump (12).

5. A hydraulic control system (10) comprising:
   a pressurized fluid source (12) adapted to generating a flow of pressurized fluid;
   a first work circuit (14) having an output flow;
   a second work circuit (16);
   an input flow path (22) connected to deliver flow of the pressurized fluid from the source (12) to the first circuit (14);
   a series flow path (24) connected to receive the output flow from the first circuit (14) and to deliver it to the second circuit (16);
   a parallel flow path (26) connected to the source (12) and to the second circuit (16) and being adapted to receive a portion of the flow from the source (12) and to deliver said portion to the second circuit (16);
   single valve means (42) in the series flow path (24) having an open position adapted to direct flow from the series flow path (24) to the second work circuit (16) and a closed position adapted to block flow from the series flow path (24) to the second work circuit (16), means biasing said single valve means to said open position;
   pressure responsive means (44) in continuous open communication with said parallel flow path (26) for permitting opening of said single valve means (42) by said biasing means in response to load pressure in the second circuit (16) being below a selected value and for closing said single valve means (42) in response to load pressure in the second circuit being above said selected value;
   means (32) for blocking at least a fraction of the flow through the parallel flow path (26) in response to differential pressure in the first circuit (14) being below a specified value; and
   means (56) for controlling the rate of fluid flow from the source (12) in response to the differential pressure in the circuit (14 or 16) having the greater of the load pressures.

6. The system (10) as set forth in claim 2, wherein said blocking means (32) modulates the fraction of the flow through said parallel flow path (26) to vary over substantially the entire range from zero flow up to the entire output of the source (12).

* * * * *